UNITED STATES PATENT OFFICE.

JESSE W. JOHNSON, OF BUFFALO, AND ALBERT S. HENDRIX, OF THORNTON, TEXAS; SAID HENDRIX ASSIGNOR TO SAID JOHNSON.

ARTIFICIAL STONE.

SPECIFICATION forming part of Letters Patent No. 656,696, dated August 28, 1900.

Application filed October 21, 1899. Serial No. 734,361. (No specimens.)

*To all whom it may concern:*

Be it known that we, JESSE W. JOHNSON, residing at Buffalo, county of Leon, and ALBERT S. HENDRIX, residing at Thornton, county of Limestone, State of Texas, citizens of the United States, have invented a new and useful Artificial Stone, of which the following is a specification.

Our invention relates to the manufacture of artificial stone, and particularly to a process for manufacturing stone adapted to be used in positions where it is exposed to the action of the elements, as are grave-stones, monuments, and the like; and a special object of our invention is to provide a stone adapted for the indicated use which will not become superficially cracked by reason of exposure and which may be readily engraved, impressed, or otherwise marked to form letters, characters, emblems, &c.

Further objects and advantages of the invention will appear in the following description and will be particularly pointed out in the appended claims.

In practice we form the body portion of the stone of a mixture, in a plastic state, of cement (Portland) and flint-sand, preferably coarse, said cement and sand being combined in the proportions of two of the former to three of the latter by weight, sufficient water being added to reduce the mixture to the desired consistency. In order that a uniform filling of the mold may be accomplished, we have found it desirable to reduce the mixture of Portland cement and coarse flint-sand, forming the body portion of the stone, to the consistency of a thin mortar; but in introducing the same into the mold we only partially fill the latter, leaving a space at the top thereof or at that side of the stone which is to receive the lettering or marking depressed approximately one-half inch below the upper edge of the mold. This space, which is left in the mold for introducing the mixture forming the body portion of the stone, we subsequently fill with a mixture of Portland cement (three parts) and fine flint-sand (one part) reduced by water to a thin mortar, and after thus completing the filling of the mold by forming a layer upon the body portion of a thickness of approximately one-half inch we strike or smooth the exterior surface of said layer and allow the material to set for two or three hours. When the surface layer, consisting of cement and fine flint-sand, has set sufficiently, we engrave the characters—such as letters, emblems, &c.—therein and then allow the material to harden sufficiently to adapt it to be removed from the mold without breaking or distorting it, an interval of from twenty-four to thirty-six hours being required for this purpose. After removal from the mold the previously-covered surfaces, or all of the surfaces with the exception of that which was exposed while in the mold and which, as above described, was treated with a layer of cement and fine flint-sand to receive the characters, are coated with a mixture of Portland cement (three parts) and air-slaked lime, (one part,) said mixture being reduced by water to a consistency adapting it to be applied with a brush, and thus spread uniformly over those surfaces which are not formed by the above-described mixture of cement and fine flint-sand. After applying this surfacing-coat of cement and lime the stone is allowed to dry slowly, the same preferably being exposed to a moderate heat, such as may be obtained in the shade, it being undesirable to expose the block to the direct rays of the sun. Also during this drying step of the process we moisten the stone at intervals with water, applied superficially—as often, for instance, as two or three times a day for a period of a week—after which it is allowed to thoroughly dry and harden. The final step in the process consists in coating the entire surface of the stone with a mixture of flake zinc, ground in oil, mixed with an equal quantity of boiled linseed-oil, said mixture being applied with a brush while the stone is in a heated condition, the same preferably being heated to a temperature of 110° to 115° Fahrenheit.

From the above description it will be seen that the body portion of the artificial stone formed in accordance with our process consists of Portland cement and sand, having a surface coating, except upon the side or sides to receive the impression of characters, of cement and lime, air-slaked lime being preferred, and such coating being applied in a liquid state by means of a brush, whereby a uniform layer is formed. Furthermore, it will be seen that when letters or other characters are to be formed in the surface of the artificial stone the block is provided with a layer formed of Portland cement and fine flint-sand, whereby the formation of the characters may be accomplished with facility and leave smooth hard surfaces. Finally, the entire surface of the block is treated to a coating of flaked zinc and boiled linseed-oil, whereby the interstices or pores are filled and the material is otherwise rendered durable, the surface of a block of artificial stone thus coated not being cracked by exposure to the elements.

Having described our invention, what we claim is—

1. The process of manufacturing artificial stone having an ornamental surface, which consists in molding part of a body portion of Portland cement and coarse flint-sand in a plastic condition; completing the molding of the body portion of Portland cement and fine flint-sand in a plastic condition; then striking off the exposed surface of the last-molded portion, upon which the ornamentation is to be produced, and allowing the material to set; subsequently engraving the characters forming the ornamentation in the surface of the last-molded portion and allowing the stone to harden; subsequently applying to the unornamented surfaces of the stone a liquid coating of Portland cement and air-slaked lime and finally applying to the entire surface of the stone, a mixture comprising flake zinc ground in oil, and linseed-oil.

2. The process of manufacturing artificial stone, which consists in molding part of a body portion of Portland cement and flint-sand; completing the molding of the body portion with a surface layer of Portland cement and flint-sand wherein the proportion of cement is greater and of sand is less than in the first-named mixture; then smoothing the surface of the last-named mixture and allowing the same to set; then engraving the ornamentation in the surface of the last-molded portion and subsequently, after allowing the stone to set, applying a liquid coating of cement and air-slaked lime to the unornamented portions, and finally applying a coating to all surfaces of oil and a pigment.

In testimony that we claim the foregoing as our own we have hereto affixed our signatures in the presence of two witnesses.

JESSE W. JOHNSON.
ALBERT S. HENDRIX.

Witnesses:
WM. GILFORD,
A. L. BRADLEY.